United States Patent [19]

Becker

[11] Patent Number: 4,530,619

[45] Date of Patent: Jul. 23, 1985

[54] SELF-RETAINING NUT AND METHOD OF APPLYING TO A PANEL

[75] Inventor: Philip D. Becker, Southbury, Conn.

[73] Assignee: Buell Industries, Inc., Waterbury, Conn.

[21] Appl. No.: 422,538

[22] Filed: Sep. 24, 1982

[51] Int. Cl.³ .......................................... F16B 39/282
[52] U.S. Cl. .................... 403/406; 403/283; 411/179; 29/432
[58] Field of Search .............. 411/172, 173, 176, 177, 411/179, 181; 403/406, 407, 408, 283, 282, 274; 29/432, 432.1, 433.2, 523

[56] References Cited

U.S. PATENT DOCUMENTS

| | | | |
|---|---|---|---|
| 2,217,026 | 10/1940 | Nickerson | 29/432 |
| 2,486,769 | 11/1949 | Watson | 411/180 |
| 2,745,458 | 5/1956 | Bedford | 411/173 X |
| 3,078,900 | 2/1963 | Walker | 29/432 |
| 3,337,946 | 8/1967 | Anderson et al. | 29/432.1 |
| 3,405,752 | 10/1968 | Neuschotz | 29/523 |
| 3,987,830 | 10/1976 | Ladouceur | 411/179 |
| 4,348,140 | 9/1982 | Bergholz et al. | 403/408 X |

Primary Examiner—Richard J. Scanlan, Jr.
Attorney, Agent, or Firm—St. Onge, Steward, Johnston & Reens

[57] ABSTRACT

A self-retaining nut, and panel assembly, in which the nut body includes a shoulder portion having two or more panel piercing pins which, are caused to pierce the panel and are bent to secure the nut to the panel. In addition, a piercing and extruding punch pierces the panel and causes extrusion or cold flow of the panel metal in the piercing region to flow into a enlarged bore or undercut portion of the nut to further aide in its retention. The assembly of the nut type fastener and the sheet panel can be accomplished in a method of application in which the pins are caused to pierce the panel, bent into fastening position and the panel is pierced and extruded to provide an opening for a threaded fastener to be secured to the nut while causing cold flow of panel material into the nut for further retention in essentially one operative step.

14 Claims, 7 Drawing Figures

U.S. Patent    Jul. 23, 1985    4,530,619
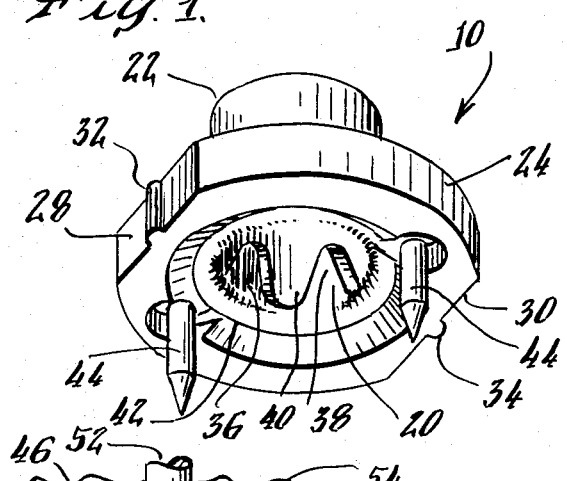
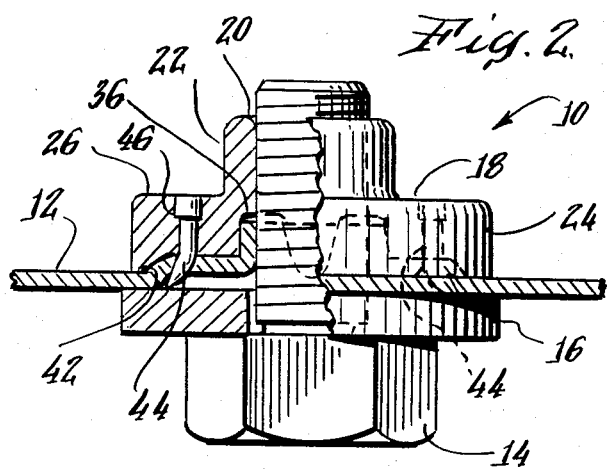
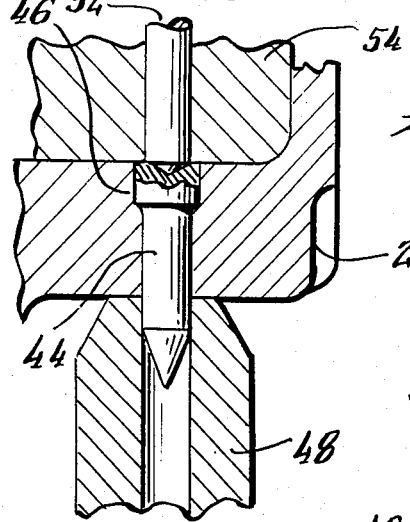
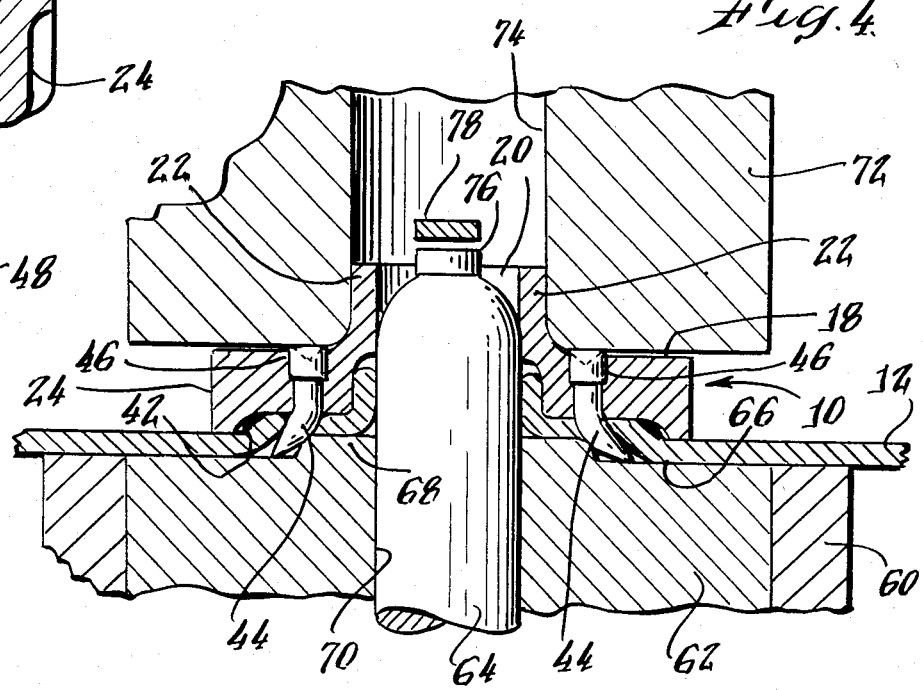
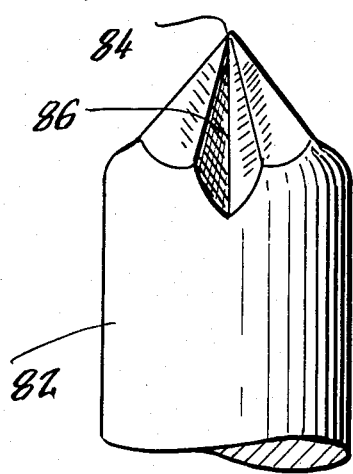
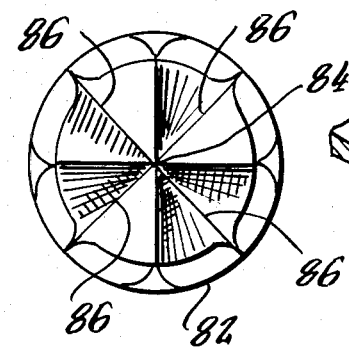
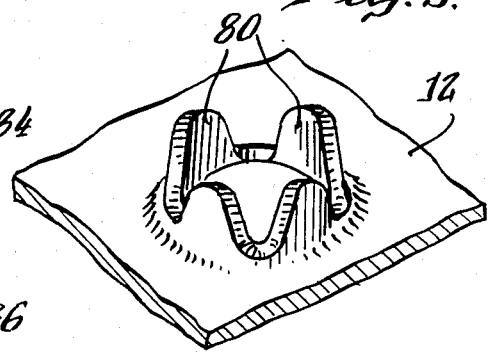

SELF-RETAINING NUT AND METHOD OF APPLYING TO A PANEL

BACKGROUND OF THE INVENTION

This invention relates to the fasteners and, in particular, to a nut to be secured to a panel to form an assembly to which elements can be fastened by the use of threaded fasteners, such as screws and bolts. This invention also relates to a method of applying the nut to the panel.

Many products are manufactured from supporting panels, such as sheet metal panels, to which are attached other elements through the use of threaded fasteners. Generally, in such instances a nut is desirably secured to the supporting panel to receive the threaded fastener in a manner such that the nut is positively maintained fixed against rotation or removal from the panel in an axial direction in order that the threaded fastener can be applied in a high volume production environment with a minimum of disruption due to dislodged nuts. Such nuts and supporting panel assemblies find particular widespread application in the automotive and related industries.

Several types of nuts are well known and in common use in connection with sheet metal panels which receive threaded fasteners, such as thread forming screws, in order to secure elements to the panels or secure panels to each other. One type of such nuts, for example those shown in U.S. Pat. Nos. 2,075,675; 2,102,558; 3,304,980 and 3,361,175 have prongs for clinching the nut to a panel through which the prongs project through a hole prepunched or predrilled through the panel. Another type of nut relies upon a piercing of the panel, by means of a pilot type projection or post, and resulting flow of metal in the vicinity of the hole pierced in the panel into undercut portions of the nut to clinch the nut into position. Examples of this type of nut are shown in U.S. Pat. Nos. 3,187,424 and 3,282,315.

U.S. Pat. Nos. 3,824,675 and 3,985,172 disclose a "panel extruding nut" and a method of panel and nut assembly in which the nut body includes two bores, the first of which nearest the panel surface has a diameter larger than the other bore. A punch is used to pierce the panel member and to extrude and shape an integral neck into the larger bore to mechanically secure the nut thereon. The diameter of this bore, together with the extruded or drawn thickness of the panel member, is substantially equal to the diameter of the other bore and slightly larger than the minor diameter of the screw thread of the thread forming screw to which the nut is to be secured. The extruded neck and the nut are then threaded by the thread forming screw. This provides another type of clinched nut.

While both clinched nuts and piercing nuts have found widespread use, they possess certain disadvantages which are undesirable in many applications. The primary disadvantage is that both types of nuts lack adequate retaining capability so that the nut may become disengaged from the panel when seeking to insert a threaded fastener, either causing the nut to drop free or rotate so that the fastener cannot be properly seated. Alternatively, where the nut is properly retained there still exists a possibility of distortion and pull through upon securing of the threaded fastener. Alternatives to these types of nuts, such as riveting or welding, are also unsatisfactory and also present handling and economic problems. The basic clinch nut itself is inconvenient to use because the panel must first be handled to drill or punch the necessary holes for insertion of the nuts.

SUMMARY OF THE INVENTION

The abovementioned disadvantages are overcome, according to this invention, through the provision of a self-retaining nut, and panel assembly, in which the nut body includes a shoulder portion having two or more panel piercing pins which, are caused to pierce the panel and are bent to secure the nut to the panel. In addition, a piercing and extruding punch pierces the panel and causes extrusion or cold flow of the panel metal in the piercing region to flow into an enlarged bore or undercut portion of the nut to further aide in its retention.

An object of this invention is the provision of a self-retaining nut-type fastener which can be secured to a sheet panel member for subsequent receipt of a threaded fastener passing through the panel.

Another object of this invention is the provision of a nut-type fastener and sheet panel assembly for use with threaded fasteners in which the nut is firmly secured to and retained by the panel free from rotation, distortion and push-out or pull-through through the use of panel piercing pins and, optionally, extrusion of the panel into the nut for further fusion retention.

The assembly of the nut type fastener and the sheet panel can be accomplished in a method of application in which the pins are caused to pierce the panel, bent into fastening position and the panel is pierced and extruded to provide an opening for a threaded fastener to be secured to the nut while causing cold flow of panel material into the nut for further retention in essentially one operative step.

Thus, a further object of this invention is the provision of a method of applying a self-retaining-fastener to a sheet panel member.

The foregoing and other objects, advantages and features of this invention will be further apparent from the following description of preferred embodiments thereof, taken in conjunction with the accompanying drawings, and from the claims appended hereto.

BRIEF DESCRIPTION OF THE DRAWINGS

Referring to the drawings:

FIG. 1 is a bottom view, in perspective, of a self-retaining nut according to an embodiment of this invention;

FIG. 2 is a front elevational view, partly in section, of the self-retaining nut according to an embodiment of this invention secured to a sheetmetal panel and having a threaded fastener therein;

FIG. 3 is a front elevational view, partly in section, of a detail of the self-retaining nut showing a pin located therein and the apparatus for inserting the pin;

FIG. 4 is a front elevational view, partly in section, of the apparatus used for the method of securing the self-retaining nut to a sheetmetal panel illustrating its use in connection with a pierce and drift punch;

FIG. 5 is a perspective view illustrating the opening formed by a drift punch and the manner in which the panel material is extruded thereby;

FIG. 6 is a front view of an alternate form of punch used in the method of this invention to split and drift the panel to which the self-retaining nut is to be applied; and, FIG. 7 is a top view showing the configuration of the tip of the punch illustrated in FIG. 6.

DESCRIPTION OF THE PREFERRED EMBODIMENTS

Referring to FIGS. 1 and 2, there is shown a nut, referred to generally at 10, which is adapted to be secured to a support member, such as a sheetmetal panel 12. After being retained on the panel 12 the nut 10 receives a threaded fastener 14 for the purpose of securing a member, represented here by the element 16, to the panel 12.

The nut 10 is formed of suitable stock material, in manner known in the art for forming nuts, and includes a body portion 18 having a central opening for receiving the threaded fastener 14. The external configuration of the body 18 includes two annular outer surfaces, one of reduced diameter 22 and one of larger diameter 24, with a shoulder or skirt 26 being formed between the two. For convenience in manufacturing, larger diameter portion of the nut has two opposed flat surfaces 28 and 30 each of which has a small ridge, 32 and 34, respectively, projecting therefrom as shown in FIG. 1.

This configuration of the larger diameter 24 permits a plurality of the nuts 10 to be formed close together in a continuous strip of stock material, the nuts being connected by narrow strips of stock material remaining when notches are cut between adjacent partially formed nuts to form the opposed flat surfaces 28 and 30. The small ridges 32 and 34 are vestiges of the connecting strips of stock material remaining when the nuts are separated during manufacture. The flat surfaces 28 and 30 serve to recess the ridges 32 and 34 within the larger diameter 24 for clearance purposes. In addition, the preferred configuration with the flat surfaces 28 and 30 allows greater numbers of the nut 10 to be formed from a given piece of stock material.

The central opening bore 20 of the nut 10 has a configured internal bore portion 36 located interiorly of the larger diameter nut portion 24. Interior section 36 is interiorly configurated in "nave-like" fashion with alternating recesses 38 and projections 40, the purpose of which is to receive the extruded or drifted portion of the panel 12 as described in greater detail below. The nut body 18 also includes an annular recess undercut 42 which is located concentric to the central opening bore 20. The opening bore 20 may be threaded or generally will be of a diameter slightly smaller than the diameter of a fastener to be received therein to accomodate self-threading fasteners as is known in the art.

The nut contains two pins 44 which are press fit into openings 46 in the shoulder 26. FIG. 3 illustrates the manner in which the pins 44 can be inserted in the nut 10. The nut portion 24 is provided with a opening 46, such as by drilling, punching or other procedure, and a pin 44 of diameter slightly larger than the diameter of opening 46 inserted therein. A support die 48 is positioned below the nut portion 24. The die 48 has an opening to receive the pin 44. A punch 52 and punch support 54 are located over the pin 44 so that the punch 52 engages its head and pushes it downward for a force fit into the opening 46. Also, instead of a tight force fit, the pin can be staked in place.

FIG. 4 illustrates the tool for attaching the nut 10 to the panel 12 in a manner so that it is retained thereon. The tool includes a support 60 surrounding an attaching punch 62 in which there is reciprocally mounted a drifting pilot punch 64. The attaching punch 62 has a flat upper surface 66 with a raised circular portion 68 which is concentric to the opening 70 in which the pilot punch 64 reciprocates. The attaching die 72 has an opening 74 adapted to receive the nut portion 22.

In operation, the panel 12 to which the nut 10 is to be attached is positioned over the attaching punch 62 and the nut 10 placed thereon. The attaching die 72 receives the nut portion 22 in its opening 74 and extends over the shoulder 18. The drifting pilot punch 64 moves upward and with its sharp upper portion 76 cuts a slug of material 78 from the panel 12 concentric with the opening 20 of the nut 10. The slug of material 78 is of a much smaller diameter than the opening of the nut 20 so that the remainder of the panel material 80 is caused to move upward and drift into the region 36 of the nut. At the same time, the relative movement of the attaching die 72 and the attaching punch 62 causes the pins 44 to pierce the panel 12 and, upon striking the raised concentric ring 68 of the attaching punch 62, to be bent and moved under the panel. In this manner, through the drifting of material 80 and the bending of the pins 44 under the panel 12 the nut is retained thereon and the nut is then securely retained upon screwing of the thread forming fastener 14 therein.

As seen in FIG. 5, the drifted material 80 may take a configuration which is complementary to the internal configuration of the nave-like section 36 of the nut 10 so that the projected material received therein further secures the nut 10 against rotational movement on threading of the fastener 14. Accordingly, the nut 10 is retained in the panel 12 as a result of both the bent pins 44 and the drifted material 80.

As an alternative to the piercing and drifting punch 64, shown in FIG. 4, which cuts the slug 78, a split and drift punch 82 which has a point 84 and "ravinelike" recesses 86 as shown in FIGS. 6 and 7 may be used. Such a punch causes the material to be split, without a slug being cut free, and to be drifted upward. In such event, the configuration of the recesses 86 on the point 84 of punch 82 must be oriented so as to cause the panel material, such as at 80, to flow upward into the recesses 38 of the section 36 of the nut 10 in complementary fashion since the punch 82 opens the sheet material in flower petal-like form. In contrast, tip 76 of the punch 64 need not be oriented in any such manner when the central slug is cut out and the material drifted.

Thus, there has been disclosed an improved self-retaining nut and method of applying it to a panel to receive a threaded fastener.

I claim:

1. A nut to be secured to a panel-like member and be self-retaining thereon comprising a nut body having a first body portion and a second body portion of a diameter greater than the first, a first end surface and a second end surface, an opening between the end surfaces for receiving a threaded fastener, a shoulder surface between the first and second body portions, pin means projecting through the second body portion in the area formed by the large diameter of the second body portion and piercingly engagable with the panel-like member, the pin means projecting beyond the second end surface a distance greater than the thickness of the panel-like member to which the nut is to be secured for passing through the panel-like member to secure the nut and to prevent relative rotation, the opening having stepped bores of varying diameter therein, a first bore in the first body portion having a diameter slightly smaller than the diameter of the threaded fastener to be received, a second bore in the second body portion having a diameter greater than the diameter of the first bore by an amount sufficient to receive an extruded portion of the panel-like member therein, for engagement therewith, while allowing the threaded fastener to pass through the extruded portion, and a third bore portion located adjacent to the second end surface and extending a diameter larger than the second bore and such that the pin means pass therethrough.

2. A nut as claimed in claim 1 wherein said pin means comprise at least two pin-like members.

3. A nut to be secured to a panel-like member and be self-retaining thereon comprising a nut body having a first body portion and a second body portion of a diameter greater than the first, a first end surface and a second end surface, an opening between the end surfaces for receiving a threaded fastener, a shoulder surface between the first and second body portions, pin means projecting through the second body portion in the area formed by the large diameter of the second body portion, the pin means projecting beyond the second end surface a distance greater than the thickness of the panel-like member to which the nut is to be secured for passing through the panel-like member to secure the nut and prevent relative rotation, the opening having stepped bores of varying diameter therein, a first bore in the first body portion having a diameter slightly smaller than the diameter of the threaded fastener to be received, a second bore in the second body portion having a diameter greater than the diameter of the first bore by an amount sufficient to receive an extruded portion of the panel-like member therein, for engagement therewith, while allowing the threaded fastener to pass through the extruded portion, and a third bore portion located adjacent to the second end surface and extending a diameter larger than the second bore and such that the pin means pass therethrough, the third bore having a depth measured from the second end surface equal to approximately the thickness of the panel-like member for receiving a deformed portion of the panel-like member adjacent the pin means.

4. A nut as claimed in claim 1 wherein the second bore has an internal nave-like configuration of alternating surface projections and recesses corresponding to the extruded portion of the panel-like member and engagable with alternating axially extending terminations of the extruded portion for further securing the nut.

5. A nut and panel assembly comprising a panel member and a nut having a nut body having a first body portion and a second body portion of a diameter greater than the first, a first end surface and a second end surface, an opening between the end surfaces for receiving a threaded fastener, an opening in the panel member aligned therewith, a shoulder surface between the first and second body portions, at least two pin-like members projecting through the second body portion in the area formed by the large diameter of the second body portion, the pin-like members projecting beyond the second end surface and being piercingly driven into and through the panel member to secure the nut to the panel member, the opening of the nut having stepped bores of varying diameter therein, a first bore in the first body portion having a diameter slightly smaller than the diameter of the threaded fastener to be received, a second bore in the second body portion having a diameter greater than the diameter of the first bore by an average amount approximately equal to the thickness of the panel member, an extruded portion of the panel member projecting into the second bore of the nut body, and a third bore located adjacent to the second end surface and extending a diameter larger than the second bore and such that the pin means pass therethrough.

6. A nut and panel assembly comprising a panel member and a nut having a nut body having a first body portion and a second body portion of a diameter greater than the first, a first end surface and a second end surface, an opening between the end surfaces for receiving a threaded fastener, an opening in the panel member aligned therewith, a shoulder surface between the first and second body portions, at least two pin-like members projecting through the second body portion in the area formed by the large diameter of the second body portion, the pin-like members projecting beyond the second end surface and being piercingly driven into and through the panel member and bent over thereunder to secure the nut to the panel member, the opening of the nut body having stepped bores of varying diameter therein, a first bore in the first body portion having a diameter slightly smaller than the diameter of the threaded fastener to be received, a second bore in the second body portion having a diameter greater than the diameter of the first bore by an average amount approximately equal to the thickness of the panel member, an extruded portion of the panel member projecting into the second bore of the nut body, and a third bore portion located adjacent to the second end surface and extending a diameter larger than the second bore and such that the pin-like members pass therethrough, the third bore having a depth measured from the second end surface equal to approximately the thickness of the panel member, the panel member being partially recessed therein.

7. A method of forming a nut and panel assembly of the type wherein the nut is self-retained on a panel member to receive a threaded fastener passing through the panel comprising forming a nut having a nut body having a first body portion and a second body portion of a diameter greater than the first, a first end surface and a second end surface, an opening between the end surfaces for receiving a threaded fastener, the opening having stepped bores of varying diameter therein, a first bore in the first body portion having a diameter slightly smaller than the diameter of the threaded fastener to be received, a second bore in the second body portion having a diameter greater than the diameter of the first bore by an average amount approximately equal to twice the thickness of the panel member, and having a shoulder surface between the first and second body portions, inserting at least two pin-like members through the second body portion in the area formed by the large diameter of the second body portion, the pin-like members projecting beyond the second end surface a distance greater than the thickness of the panel-like member to which the nut is to be secured, positioning the nut and panel member in juxtaposition to one another and then driving the pins to pierce the panel member and be bent over thereunder to secure the nut to the panel.

8. A method as claimed in claim 7 further comprising forming an opening in the panel member aligned with the opening in the nut and causing panel member material to be extruded into the nut opening second bore.

9. A method as claimed in claim 8 wherein the nut opening has a third bore portion located adjacent to the second end surface and extending a diameter larger than the second bore and such that the pin-like members pass therethrough, the third bore having a depth measured from the second end surface equal to approximately the thickness of the panel member, and the panel member is caused to at least partially project therein.

10. A self-retained nut for securing a panel comprising a nut body having first and second body portions, the second portion having a greater diameter than the first, a panel engaging surface on said second body portion, an opening in said first body portion for receiving a fastener, a second opening in said second body portion concentric with and of larger diameter than said first body opening for receiving the fastener together with a portion of the panel, an annular recess in said second opening and cooperating therewith to receive said portion of the panel and pin means in said nut body second portion and projecting through said annular recess for driven engagement with the panel, such that material from said panel may be forced into said second opening as a fastener hole is formed in the panel and said pin means may be driven through the panel and bent over thereunder to further retain the nut to the panel.

11. A self-retained nut as set forth in claim 10 wherein said second opening is provided with projections toward the panel for engaging portions of the panel which are deformed into said second opening to further retain the nut.

12. A self-retained nut for securing a panel comprising a nut body having first and second body portions, the second portion having a greater diameter than the first, a panel engaging surface on said second body portion, an opening in said first body portion for receiving a fastener, a second opening in said second body portion concentric with and of larger diameter than said first body opening, and pin means in said nut body second portion for driven engagement with the panel, whereby material from said panel may be forced into said second opening as a fastener hole is formed in the panel and said pin means is driven into the panel to further retain the nut to the panel, and a third opening in said second body portion of larger diameter than said second opening and into which the panel may be deformed, such that the pin means may penetrate the deformed portion of the panel and be bent over thereunder without protruding beyond the panel.

13. A self-retained nut as set forth in claim 12 wherein said pin means comprises two or more pins which are deformable in said third opening to retain the nut to the panel.

14. A self-retained nut as set forth in claim 12 wherein said third opening has a depth approximately the thickness of the panel to which the nut is secured.

* * * * *